US010802672B2

(12) United States Patent
Kattamanchi et al.

(10) Patent No.: US 10,802,672 B2
(45) Date of Patent: Oct. 13, 2020

(54) SOFTWARE APPLICATION PORTFOLIO DISCOVERY AND MANAGEMENT

(71) Applicant: ServiceNow, Inc., Santa Clara, CA (US)

(72) Inventors: Shankar Janardhan Kattamanchi, Hyderabad (IN); Praveen Minnikaran Damodaran, Hyderabad (IN); Nitin Lahanu Hase, Hyderabad (IN); Yogesh Deepak Devatraj, Hyderabad (IN); Krishna Chaitanya Durgasi, Andhra Pradesh (IN); Sharath Chandra Lagisetty, Hyderabad (IN); Krishna Chaitanya Kagitala, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 121 days.

(21) Appl. No.: 15/651,953

(22) Filed: Jul. 17, 2017

(65) Prior Publication Data
US 2018/0321796 A1 Nov. 8, 2018

(30) Foreign Application Priority Data
May 5, 2017 (IN) .............................. 201711015992

(51) Int. Cl.
*G06F 3/0482* (2013.01)
*G06F 16/903* (2019.01)
(Continued)

(52) U.S. Cl.
CPC ........ *G06F 3/0482* (2013.01); *G06F 11/3409* (2013.01); *G06F 11/3447* (2013.01);
(Continued)

(58) Field of Classification Search
CPC ............. G06F 11/3452; G06F 11/3409; G06F 11/3447
See application file for complete search history.

(56) References Cited

U.S. PATENT DOCUMENTS

2006/0224479 A1* 10/2006 Bishop .................. G06Q 40/00
705/35
2007/0143827 A1* 6/2007 Nicodemus ......... G06F 21/6218
726/2
(Continued)

OTHER PUBLICATIONS

Cisco Operating, "Health Scores" <URL=https://www.cisco.com/c/en/us/td/docs/switches/datacenter/aci/apic/sw/1-x/Operating_ACI/guide/b_Cisco_Operating_ACI/b_Cisco_Operating_ACI_chapter_01010.pdf> (Year: 2015).*

(Continued)

*Primary Examiner* — James T Tsai
(74) *Attorney, Agent, or Firm* — Fletcher Yoder P.C.

(57) ABSTRACT

An example embodiment may involve receiving, by a server device disposed within a remote network management platform, a request for a graphical representation of capabilities provided by a set of applications configured to execute on computing devices disposed within a managed network, and obtaining, by the server device, information regarding the capabilities provided by the set of applications. The embodiment may further involve transmitting, by the server device and to the client device, a representation of a graphical user interface that includes a first portion populated by representations of the capabilities with capability scores that are color-coded to represent how well their respective capabilities are serviced by the applications. The graphical user interface may also include a second portion that is configurable to display counts of the capability scores with each color coding, or a specific capability of the capabilities mapped to applications that support the specific capability.

18 Claims, 13 Drawing Sheets

(51) Int. Cl.
  *G06F 16/245* (2019.01)
  *G06F 11/34* (2006.01)
(52) U.S. Cl.
  CPC ........ *G06F 11/3452* (2013.01); *G06F 16/245* (2019.01); *G06F 16/90335* (2019.01)

(56) References Cited

U.S. PATENT DOCUMENTS

| | | | | |
|---|---|---|---|---|
| 2011/0055380 A1* | 3/2011 | Yockey | .................... | H04L 41/12 709/224 |
| 2012/0030158 A1* | 2/2012 | Hofberg | ........... | G06Q 10/06315 706/45 |
| 2012/0191704 A1* | 7/2012 | Jones | .................... | G06F 3/0484 707/722 |
| 2014/0189670 A1* | 7/2014 | Clay | .................. | G06F 9/44505 717/168 |
| 2015/0186533 A1* | 7/2015 | Patil | .................... | G06F 16/9535 707/723 |
| 2016/0357808 A1* | 12/2016 | Morris | .................... | G06F 9/453 |
| 2017/0330118 A1* | 11/2017 | Brombach | ......... | G06Q 10/0637 |

OTHER PUBLICATIONS

D. A. D'Mello, S. Salian, Sahana, N. Shetty, C. Rodrigues and C. D'Souza, "Service crawler based effective and dynamic discovery mechanism for Web Services available over the Internet," 2012 12th International Conference on Intelligent Systems Design and Applications (ISDA), Kochi, 2012, pp. 425-430. (Year: 2012).*

* cited by examiner 800  802  804
806  USER ACCOUNT  SETTINGS

◁ ≡  IDEA [NEW RECORD]  SUBMIT

ACTION [    ]  BUSINESS APPLICATION [     🔍]
STRATEGY [    ]  BUSINESS ENTITY [    🔍]
REPLACEMENT APPLICATION [    🔍]  IMPLEMENT BY FISCAL YEAR [    🔍]
START BY FISCAL YEAR [    🔍]  PROGRAM [    🔍]
TITLE [                    ]
DESCRIPTION [                    ]

808
ESTIMATES
EFFORT SIZE [    ]  ESTIMATED FINANCIAL BENEFIT [    ]
ESTIMATED GOAL CONTRIBUTION % [    ]
SUBMIT

FIG. 8

SOFTWARE APPLICATION PORTFOLIO DISCOVERY AND MANAGEMENT

CROSS-REFERENCE TO RELATED APPLICATION

This application claims priority to and the benefit of Indian Patent Application No. 201711015992, entitled "SOFTWARE APPLICATION PORTFOLIO DISCOVERY AND MANAGEMENT", filed May 5, 2017, which is herein incorporated by reference in its entirety.

BACKGROUND

An enterprise network may involve many interrelated operations, such as human resources (HR), supply chain, information technology (IT), and finance as well unique operations custom to the enterprise. As such, each operation within the enterprise network may use software applications, including off-the-shelf software applications and custom software applications designed to meet particular requirements. As a result, these operations may use a number of applications causing the enterprise network to have a large inventory of applications to monitor and manage. Without adequate tracking of the usage and capabilities of these applications, the enterprise network may devote resources supporting applications that may no longer be needed.

SUMMARY

It is now common for enterprise networks to support dozens, hundreds, or even thousands of software applications across various operations. Therefore, to make sure that the enterprise network utilizes resources efficiently, there is a need for an enterprise network to have application portfolio management tools to clearly view and manage an inventory of applications used by different operations within the enterprise network.

Accordingly, a first example embodiment may involve receiving, by a server device disposed within a remote network management platform, a request for a graphical representation of a plurality of capabilities provided by a set of applications configured to execute on computing devices disposed within a managed network. Particularly, the remote network management platform may manage the set of applications and the computing devices. In some instances, the service device may receive the request from a client device disposed within the managed network. The first example embodiment may also involve obtaining, by the server device, information regarding the plurality of capabilities provided by the set of applications, and transmitting, by the server device and to the client device, a representation of a graphical user interface. The graphical user interface may include a first portion and a second portion. For instance, the first portion may be populated by representations of the plurality of capabilities with respective capability scores, and the respective capability scores may be color-coded to represent how well their respective capabilities are serviced by the set of applications. The second portion may be configurable to display respective counts of the capability scores with each color coding, or a specific capability of the plurality of capabilities mapped to one or more of the set of applications that support the specific capability.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include a proxy server application disposed within a managed network. The managed network may include computing devices configured to execute a set of applications that provide a plurality of capabilities. The system may further include one or more server devices disposed within a remote network management platform. The remote network management platform may manage the managed network, and the one or more server devices may be configured to obtain information regarding the computing devices by way of the proxy server application. The one or more server devices may be configured to perform operations in accordance with the first example embodiment.

In a fifth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts a graphical interface for creating a representation of an idea, in accordance with example embodiments.

DETAILED DESCRIPTION

Figure 1:
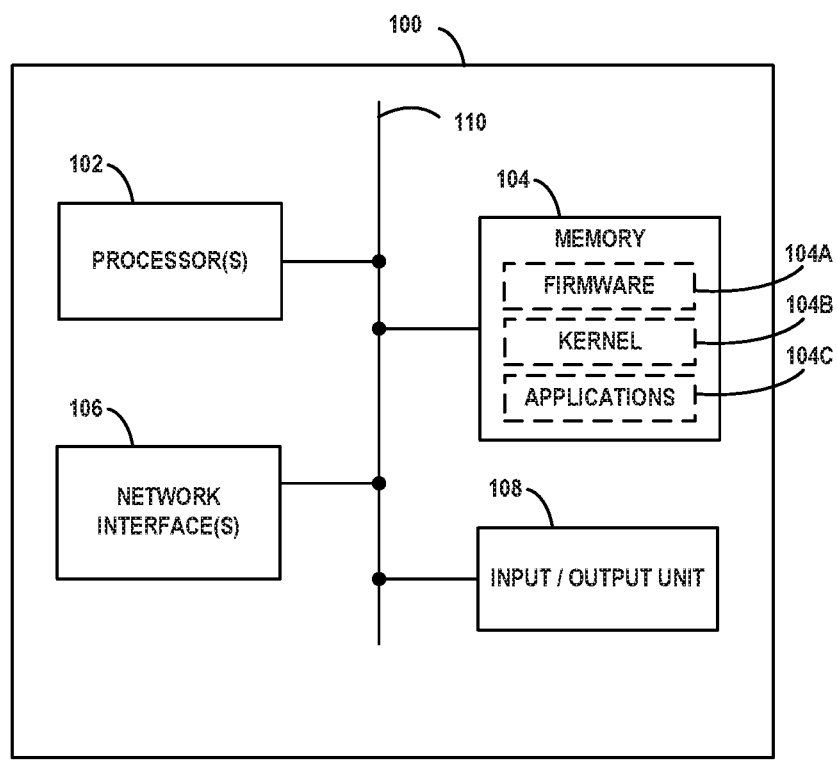
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
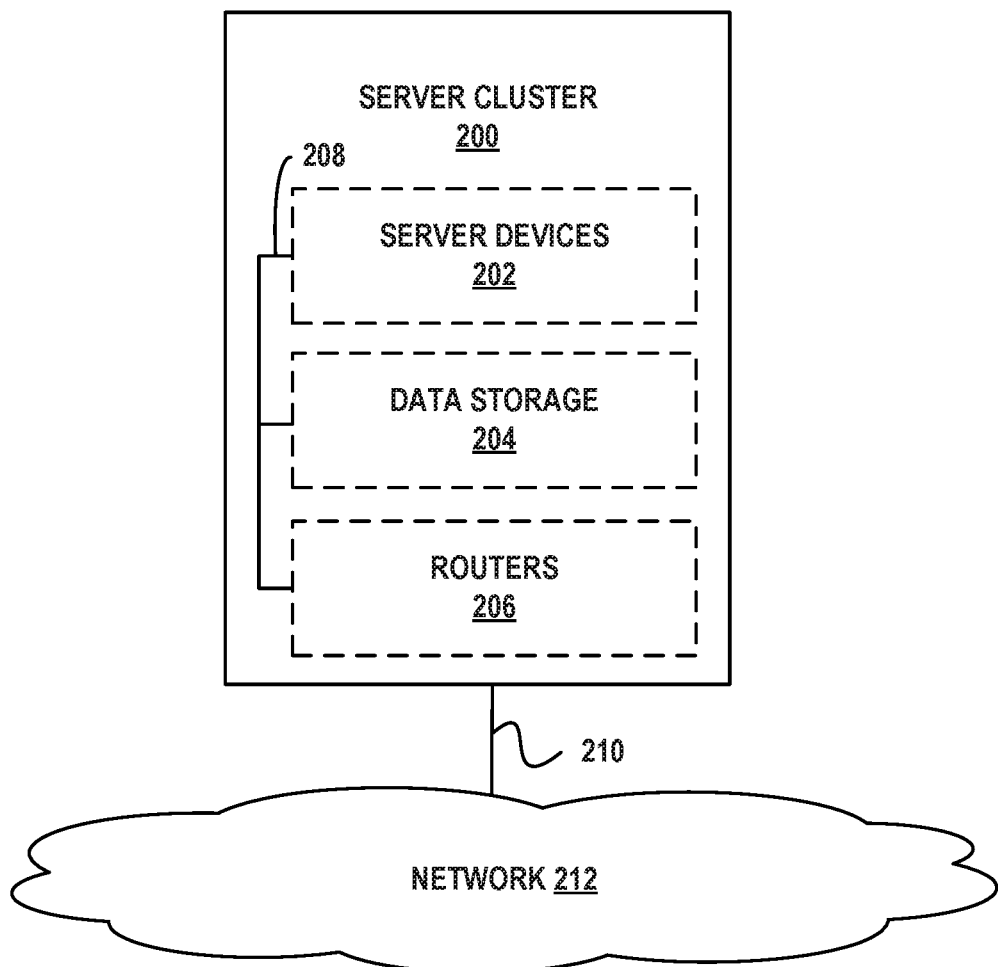
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
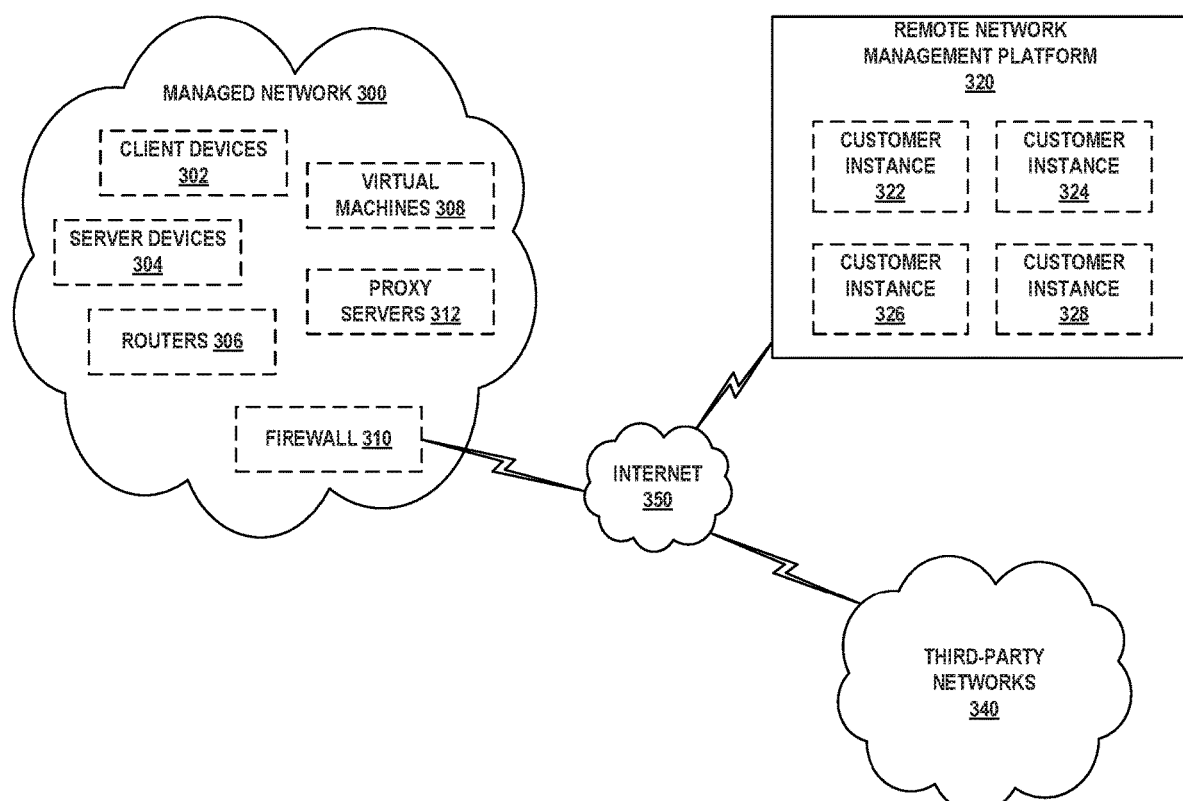
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
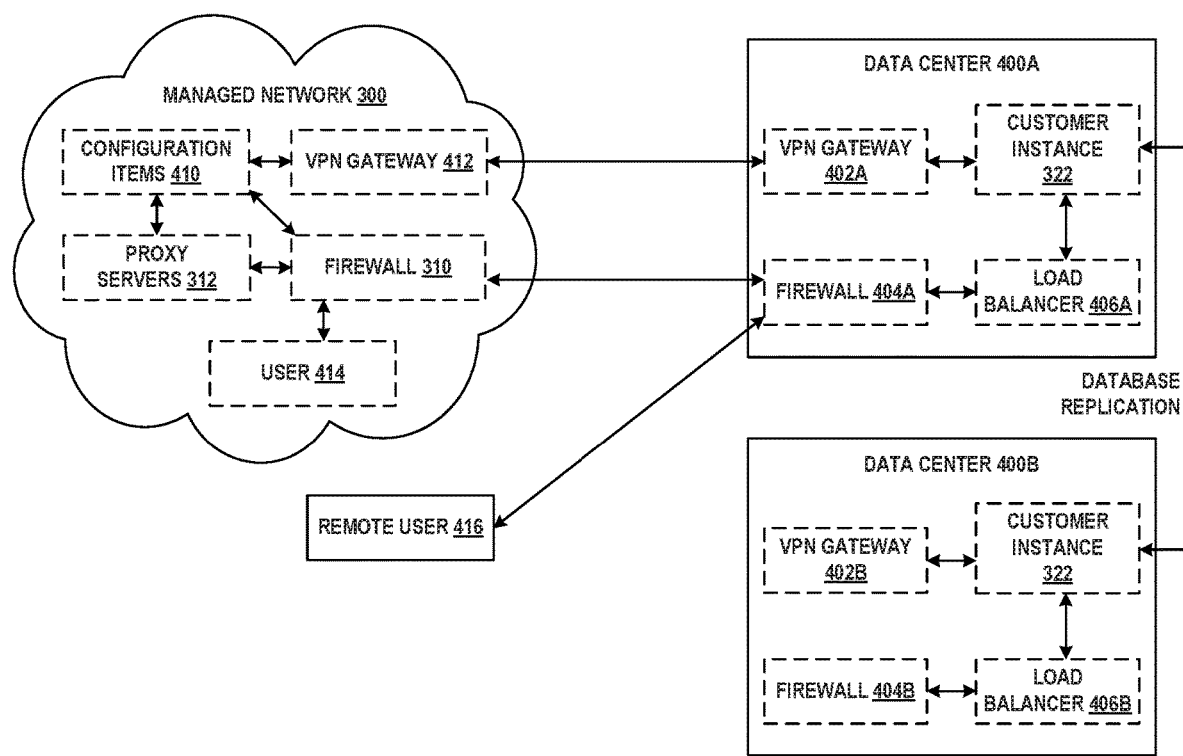
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
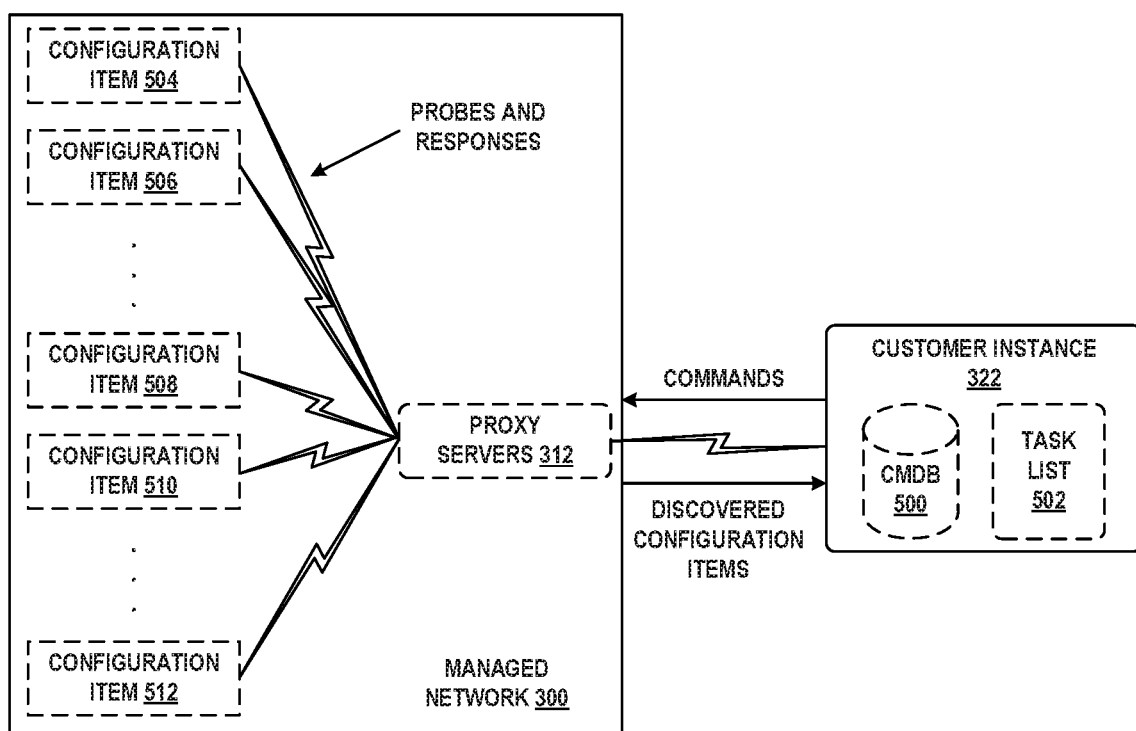
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
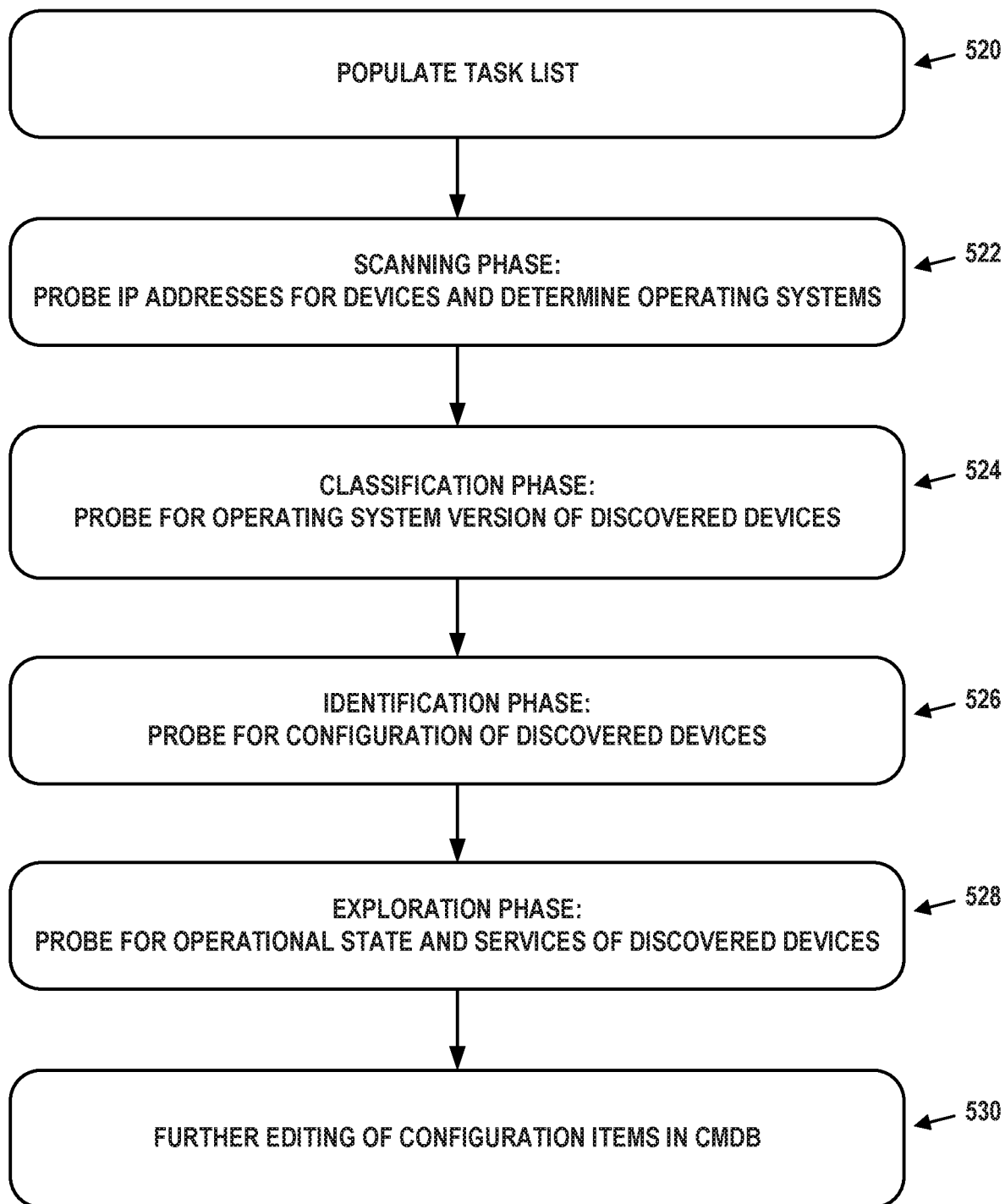
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Application Portfolio Management

An enterprise network (e.g., managed network 300) may support numerous client devices 302 configured to complete goals for operations across the enterprise network. Particularly, operations, such as HR, IT, finance, or even unique enterprise-specific operations, may perform tasks using software applications. These applications may include off-the-shelf applications as well as custom-developed applications.

For instance, users performing roles in the HR operation of the enterprise network may perform tasks using underlying applications to hire new employees, organize payroll and benefits for employees, and complete other HR-related goals. As another example, the finance operation within an enterprise network may perform finance-related tasks using applications, such as spreadsheets and financial modeling software, among other applications. With other operations similarly using additional applications to perform tasks and complete goals, the enterprise network may end up devoting resources to dozens, hundreds, or even thousands of different applications.

Although sets of applications may help each operation within the enterprise network perform tasks to complete goals, the enterprise network may often fail to monitor and manage its inventory of applications successfully. Particularly, the enterprise network may not have the portfolio management tools available to view applications in an organized inventory to access the use and contributions provided by each application. Further, since the enterprise may lack the tools to monitor and understand the contributions provided by respective applications created and/or used by the various organizations within the network, the enterprise network may often continue to devote resources to support applications regardless whether an application benefits an operation or the enterprise network enough to justify the continued support. As a result, the enterprise network may potentially waste resources on a number of applications that fail to adequately benefit the enterprise network.

For example, in some cases, an enterprise network may continue to support unused or rarely used applications, outdated applications, or even duplicate applications that accomplish substantially similar tasks, as well as other applications that the enterprise may no longer need. Further, the enterprise network may also lack the tools necessary to identify particularly useful applications that may provide additional benefits to other operations within managed network 300. Therefore, for at least the above reasons, an enterprise network may often fail to manage its inventory of applications in a way that ensures useful applications continue to receive upgrades and support while other less-contributory applications are appropriately retired and potentially replaced. Consequently, there exists a clear need for a platform that can enable users operating in the enterprise network to view, understand, and manage the enterprise's portfolio of applications.

Example embodiments presented herein relate to application portfolio management tools that may help improve the organization and management of applications in an enterprise network. An example application portfolio management system may systematically gather information about various applications used within an enterprise network and present the information in clear, logical graphical representations that can enable users to understand and manage the inventory of applications. In further example embodiments, the system may also analyze and depict how well sets of applications support tasks and underlying capabilities performed by operations within the enterprise network, which may enable a user to understand contributions provided by each application. For instance, the user may use the application portfolio management tools to identify a task performed by an operation within the enterprise network that is not effectively supported by the applications used by the operations to complete the task.

In an example embodiment, an application portfolio management system may be configured to automatically obtain information about each application used within the enterprise network. The information may indicate how many devices use a given application (and how often), the manufacturer of the application, the process or underlying capability associated with the application, among other information. For example, the system may gather the information from customer instance 322 and other sources managed by remote network management platform 320 and use the information to provide a user interface with portfolio management tools that can enables users on client devices 302 to view the information in a customizable, organized manner.

The system may gather information about applications using the discovery process depicted in FIG. 5B. For instance, the system may obtain information during the exploration phase involving determining the operational state and services executing on discovered devices. As a result, the system may have information indicative of the application inventory of the enterprise network available before receiving a request from a client device to access the information. In a further example embodiment, the system may automatically update the information periodically. Alternatively, the system may also update the information continuously.

In some examples, an application portfolio management system may be configured to enable a user to select and view applications associated with a particular operation (e.g., finance) or task (e.g., employee payroll) performed by an operation in the enterprise network. For instance, a user on a client device may receive and use a graphical user interface from the application portfolio management system to search for particular information about an application or set of applications, such as the last update of a particular application or set of applications or an application's source or manufacturer.

The tools provided by the portfolio management system may enable a user or users to manage the inventory of applications used across the enterprise network. For instance, a user may view information provided regarding the inventory that may assist decisions when to upgrade an application, retire an application, or even add additional applications. Accordingly, the application portfolio management system may also enable a user to identify applications that are rarely used and remove these applications, which in turn may save resources of the enterprise network.

The application portfolio management system may also enable a user to obtain a better understanding of the capabilities and tasks supported by an application or set of applications. For instance, the tools provided by the system may allow a user to identify a task or underlying capability that may benefit from adjustments in the applications used when performing the capability or task. As a result, the user may use the tools to help improve the productivity of an operation within the enterprise network.

Figure 6A:
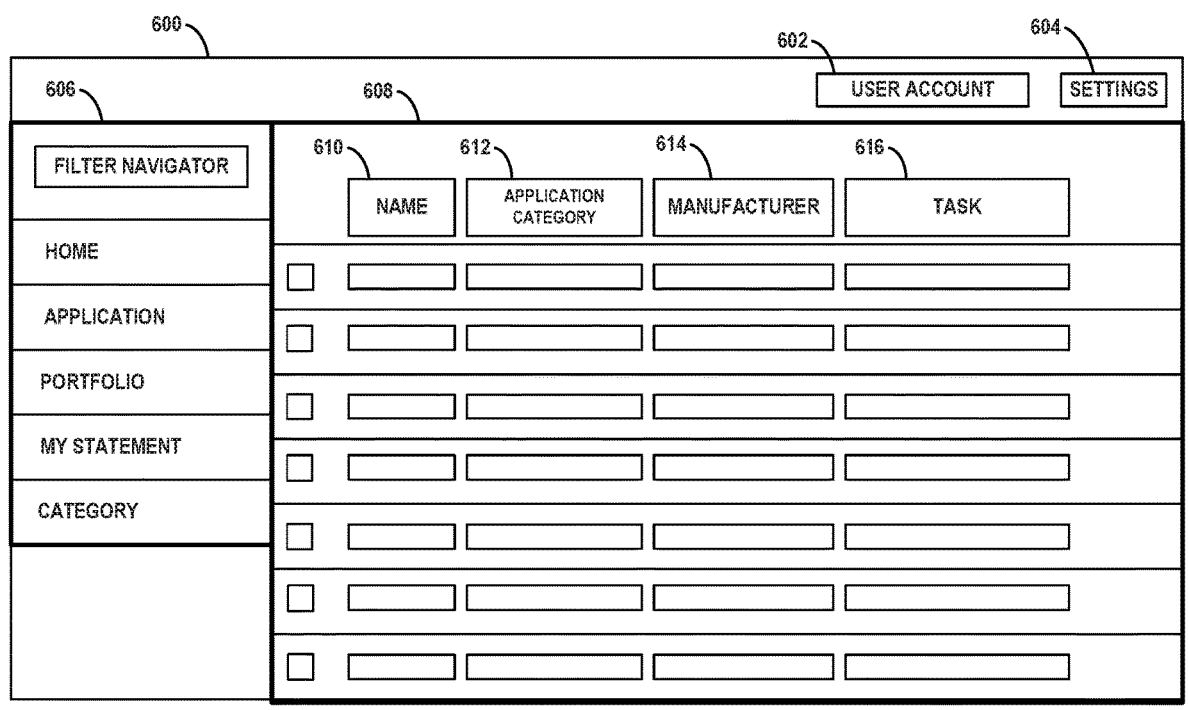
FIG. 6A depicts a graphical user interface for application portfolio management, in accordance with example embodiments.

FIG. 6A depicts a graphical user interface for application portfolio management, in accordance with example embodiments. Particularly, an application portfolio management system may provide interface 600 to convey application information in a visual, interactive format to one or multiple entities (e.g., client devices 302) in managed network 300 or remotely accessing interface 600 from another location. As shown, interface 600 includes various elements, such as user account 602, settings 604, and navigation bar 606 as well as an inventory portion 608 configurable to depict application information arranged according to particular parameters, including application name 610, application category 612, manufacturer 614, and related task 616. Although interface 600 is depicted in a particular configuration, interface 600 can have other configurations within other examples.

User account 602 represents a portion of interface 600 that may enable a user of a client device to login and store settings 604 associated with interface 600. In some cases, user account 602 may require the user to provide credentials (e.g., a password) to access information depicted within interface 600. After receiving a user login, interface 600 may be configured to restore a user's preferred settings after the user provides credentials via user account 602. In a further example, a server device providing interface 600 may receive login credentials from a user's client device without requiring the user to provide a password or other information.

Similar to user account 602, settings 604 may enable a user to modify the configuration or other elements of interface 600. For instance, settings 604 may enable a user to format and customize the visual representation of interface 600. As an example, a user may use settings 604 to modify colors and fonts used in interface 600.

Navigation bar 606 represents a portion of interface 600 that may enable a user to select items relating to interface 600. For instance, a user of a client device may use the filter navigator to search through the application inventory of the enterprise network. In the example illustrated in FIG. 6A, navigation bar 606 includes options, such as 'home', 'application', 'portfolio', 'my statement', and 'category', but may include other selectable options in other examples. The different options may help a user navigate interface 600 and other related interfaces provided by the application portfolio management system.

Application inventory 608 represents a portion of interface 600 that enables a user to arrange the information conveyed about the inventory of applications used by the enterprise according to selectable parameters. For example, application inventory 608 may enable a user to select a subset of the enterprise applications to be arranged in an order based on different categories, such as application name 610, application category 612, manufacturer 614, or associated task 616, among other possible parameters. As an example, a user may select to view information regarding applications that support a particular financial task (e.g., payroll) by selecting associated task 616. Similarly, a user may select manufacturer 614 to view applications produced by a particular software developer. In other examples, application inventory 608 may include other possible parameters for organizing and viewing application information for applications used in the enterprise network.

Figure 6B:
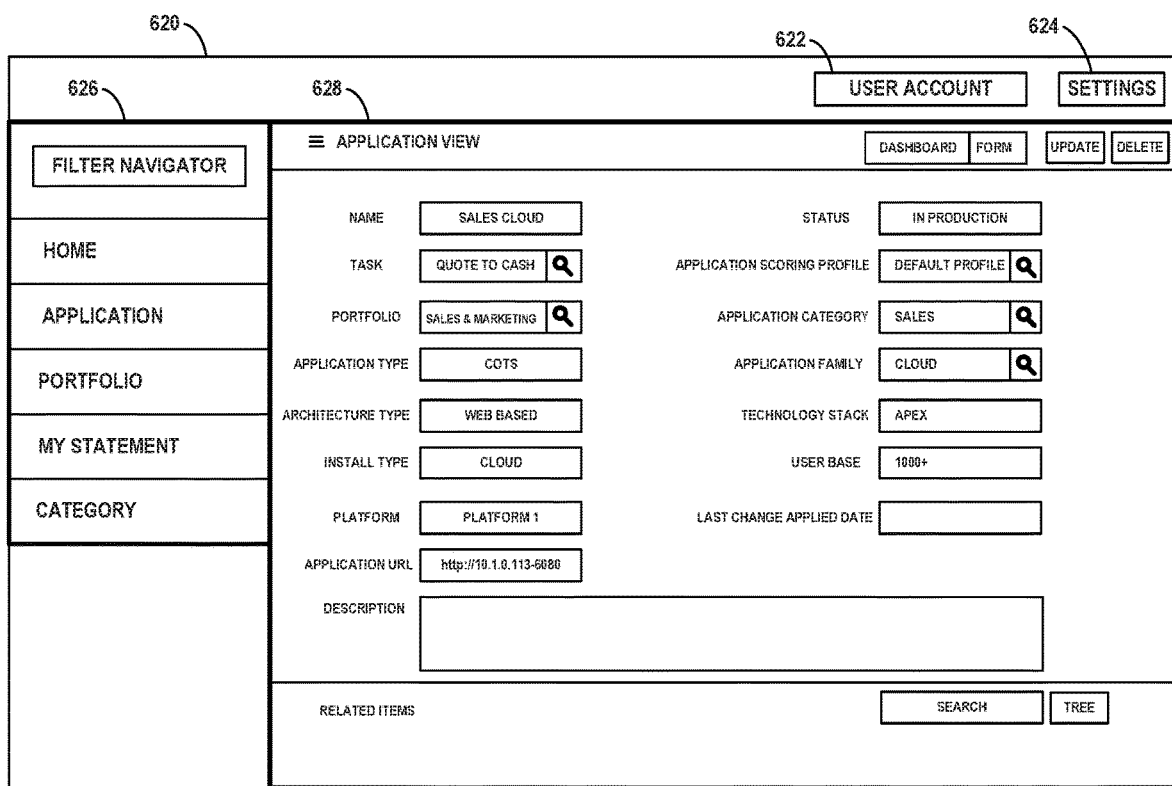
FIG. 6B depicts an application inventory graphical user interface, in accordance with example embodiments.

FIG. 6B depicts an application inventory graphical user interface, in accordance with example embodiments. In a manner similar to interface 600, interface 620 includes user account 622, settings 624, and navigation bar 626, but further includes an additional element, application view 628, which is configurable to depict information about a particular application or a set of applications used in the enterprise network. In other examples, interface 620 may have other configurations, which may include more or fewer elements.

An application portfolio management system may provide interface 620 configured with application view 628 to enable a user using a client device to provide or view information about an application or set of applications. Particularly, application view 628 includes input elements that allow a user to provide parameters regarding an application used within the enterprise network, such as a description of the application, the name of the application, a task performed by an operation that is supported by the application (e.g., product delivery performed by supply chain), an associated portfolio (e.g., applications typically used with the given application), the type of the application, the architecture type of the application, the install type of the application, the associated platform of the application, the application URL, the current status of the application, the profile for scoring the application, the associated application category, the associated application family, the associated technology stack, user base (e.g., number of users of the application), and the last change applied date, among other possible information.

As shown, application view 628 may include selectable input elements that can direct a user to provide particular information that the system may use to organize the inventory of applications for analysis and further management. Some of the input elements may use a searchable set of choices that a user may use to select a choice applicable to the corresponding application. In a further example, the system may be configured to auto-populate the different categories listed in application view 628 using information obtained from devices operating in the enterprise network.

In some example embodiments, an application portfolio management system may also be configured to provide a graphical interface showing a capability map to users of client devices that enable the users to further understand a task and underlying capabilities supported by sets of applications. A task may be a set of tasks performed by an operation in the enterprise network. For example, the IT operation in an enterprise network may perform a network set up task. Capabilities may represent steps or sub-tasks performed to contribute and ultimately complete the task. As such, the system may provide a capability map in response to a selection of a particular application or process displayed in inventory management interface 600.

Figure 7A:
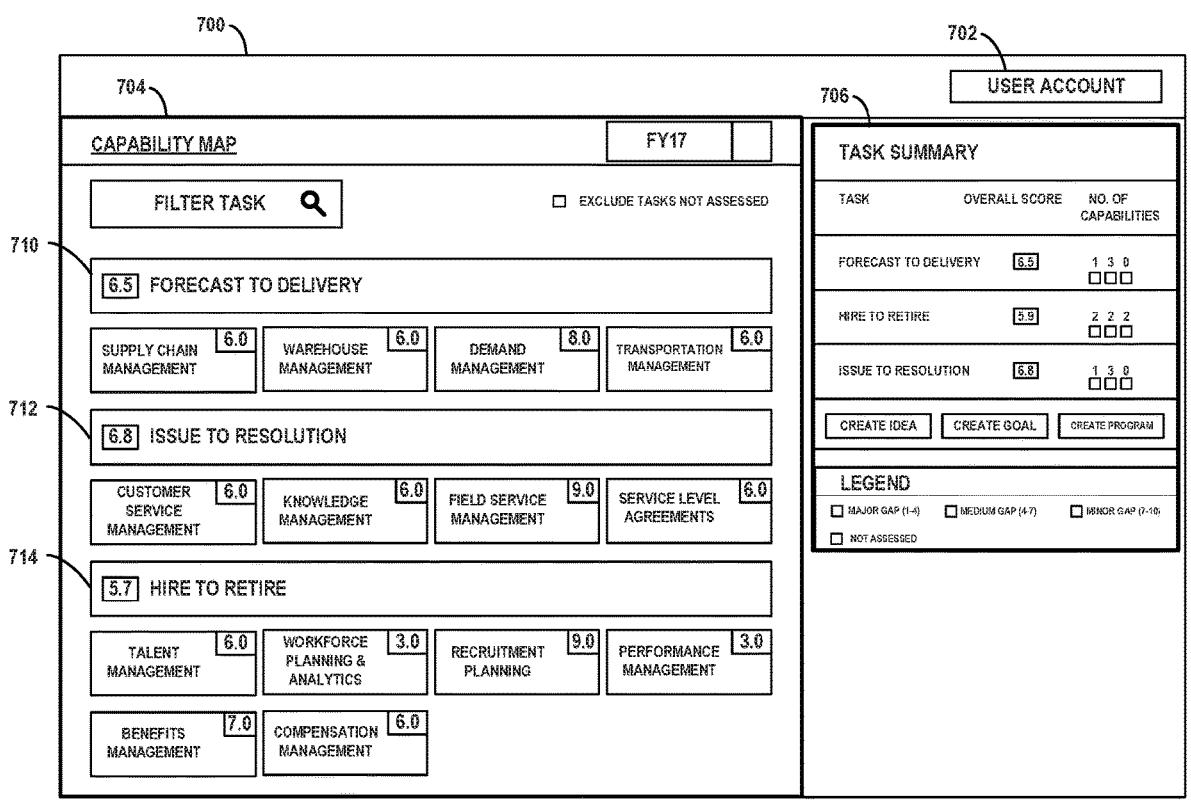
FIG. 7A depicts a capability map, in accordance with example embodiments.

FIG. 7A depicts a graphical interface showing a capability map, in accordance with example embodiments. An application portfolio management system may provide interface 700 to enable a user to view and understand a task or sets of tasks performed by an operation or operations within enterprise network and how well underlying applications support the overall task(s) and the various capabilities associated with completing the task(s). Similar to interface 600 and interface 620 depicted in FIGS. 6A-6B, interface 700 includes user account 702 that enables the system to provide preferred settings of a particular user. Additionally, interface 700 includes capability map 704 and process summary 706 configurable to provide additional information associated with a particular operation or operations (e.g., HR, finance, IT, custom operation) of the enterprise network.

Capability map 704 represents a first portion of interface 700 configurable to arrange and convey information about tasks and underlying capabilities performed by an operation in the enterprise network. As indicated above, a capability may represent a sub-task that supports one or more tasks performed by an operation, such as HR, finance, IT, or custom operations. For instance, a capability may be "Warehouse Management" that serves as a sub-task that supports the task, "Forecast to Delivery" 710 performed by a supply chain operation of an enterprise network. As such, capability map 704 may be configured to display a number of tasks performed by one or multiple operations of the enterprise network and also depict capabilities that support each task listed in capability map 704.

Capability map 704 may enable a user to select a task to obtain further information about the capabilities and applications that support the selected task. In addition, a user may use the search function of capability map 704 to view information specific to a given time frames (e.g., years, quarters), and/or filter the information displayed within capability map 704. As illustrated in FIG. 7A, capability map 704 is displaying several tasks related to the operations of the enterprise network, including task "Forecast to Delivery" 710 performed by the supply chain operation, "Issue to Resolution" 712 performed by the IT operation, and "Hire to Retire" 714 performed by the HR operation. In other examples, capability map 704 may display more or fewer tasks and capabilities relating to various operations in the enterprise, such as finance, IT, or a custom operation. In a further example, capability map 704 may display multiple tasks performed by a particular operation in the enterprise network.

As shown, process "Forecast to Delivery" 710 represents a task performed by the supply chain operation within the enterprise network that may involve several underlying capabilities to complete, such "Supply Chain Management", "Warehouse Management", "Demand Management", and "Transportation Management". These different capabilities as well as other potential tasks or capabilities (not shown in FIG. 7A) may be supported by sets of applications that the supply chain operation uses to perform the capabilities and complete the task. For instance, a set of applications may enable users in the supply chain operation of the enterprise network to complete the task "Forecast to Delivery" 710.

Additionally, as further illustrated in FIG. 7A, each capability supporting the task "Forecast to Delivery" 710 is assigned a capability score (e.g., "Supply Chain Management" is given a "6.0" score). The application portfolio management system may determine capabilities scores based on a variety of parameters associated with the performance of a task or the underlying capabilities, which may involve analyzing each application that help support completion of the task or a given capability. By extension, the system may assign scores to each task and capabilities in capability map 704 to assist the user identify a task or capability that may require addition review. For instance, the system may enable a user to identify a task that is not properly supported by the underlying applications. Accordingly, the user may review the supporting applications to check if any applications should be modified (e.g., upgraded) or removed.

In the example, capability scores may range from "0 to 10" with scores close to "0" representing lower scores, scores near "5.0" representing average scores, and scores near "10.0" representing higher scores. Further, in some examples, the scores may also be color-coded to visually depict the scores of the capabilities. For example, higher scores may be colored green (e.g., scores "8.0"-"10.0"), average scores may be colored orange (e.g., scores "3.0"-"8.0"), and lower scores may be colored red (e.g., scores "0.0"-"3.0"). Other examples may convey scores of applications in other ways, including different colors or other forms of numerical representations (e.g., percentages).

As shown, the task "Forecast to Delivery" 710 is supported by capabilities "Supply Chain Management", "Warehouse Management" and "Transportation Management," which are all displayed as having slightly above average scores of "6.0". On the other hand, the other capability supporting the "Forecast to Delivery" 710 task is "Demand Management," which is assigned a higher capability score of "8.0". Accordingly, interface 700 further represents that that task "Forecast to Delivery" 710 is assigned a score of "6.5", which corresponds to the average of the scores of the underlying capabilities that contribute to completing the task "Forecast to Delivery" 710. The application portfolio management system may assign the scores based on information obtained regarding performance of the different capabilities. For instance, the system may analyze the support provided by underlying applications that assist the completion of the different capabilities. As such, the system may assign and display the scores with the different capabilities to inform a user which capabilities are performed well and which may need further attention.

The task, "Issue to Resolution" 712, included in capability map 704 represents a task performed by the IT operation in the enterprise network. Similar to "Forecast to Delivery" 710, interface 700 depicts the task "Issue to Resolution" 712 grouped with supporting capabilities, such as "Customer Service Management", "Knowledge Management", "Field Service Management", and "Service Level Agreements". These capabilities are also shown in capability map 704 having respective scores that indicate how well each capability supports the task "Issue to Resolution" 712. Similarly, capability map 704 also shows the task "Hire to Retire" 714 performed by the HR operation in the enterprise network along with supporting capabilities, such as "Talent Management", "Workforce Planning & Analytics", "Recruitment Planning, Performance Management", "Benefits Management", and "Compensation Management". Like the other capabilities discussed above, each capability that supports the task "Hire to Retire" 714 includes an assigned capability score (i.e., a numerical value 1-10) that represents how well it supports the task "Hire to Retire" 714.

Interface 700 further includes task summary 706 configurable to supplement information included in capability map 704. Task summary 706 may depict the overall scores of the tasks listed in capability map 704 (e.g., "Forecast to Delivery" 710, "Issue to Resolution" 712, and "Hire to Retire" 714) and may also provide total counts of the capability scores according to the assigned color coding. For example, task summary 706 shows the task "Forecast to Delivery" 710 supported by a single high scoring capability (e.g., "Demand Management" with a score of 8.0) and three average scoring capabilities ("Supply Chain Management", "Demand Management", and "Transportation Management" with respective scores of "6.0"). Additionally, task summary 706 includes a legend that indicates how a user should interpret the different scores assigned to the tasks and corresponding capabilities.

In some examples, task summary 706 may also provide additional information about the different tasks displayed in capability map 704 and also enable a user to perform other tasks, such as create an idea, a goal, or a program. These tasks may allow for additional customization from users of client devices in the enterprise network. For example, a user may create an idea to add a new application or capability to support a task performed by an operation.

Figure 7B:
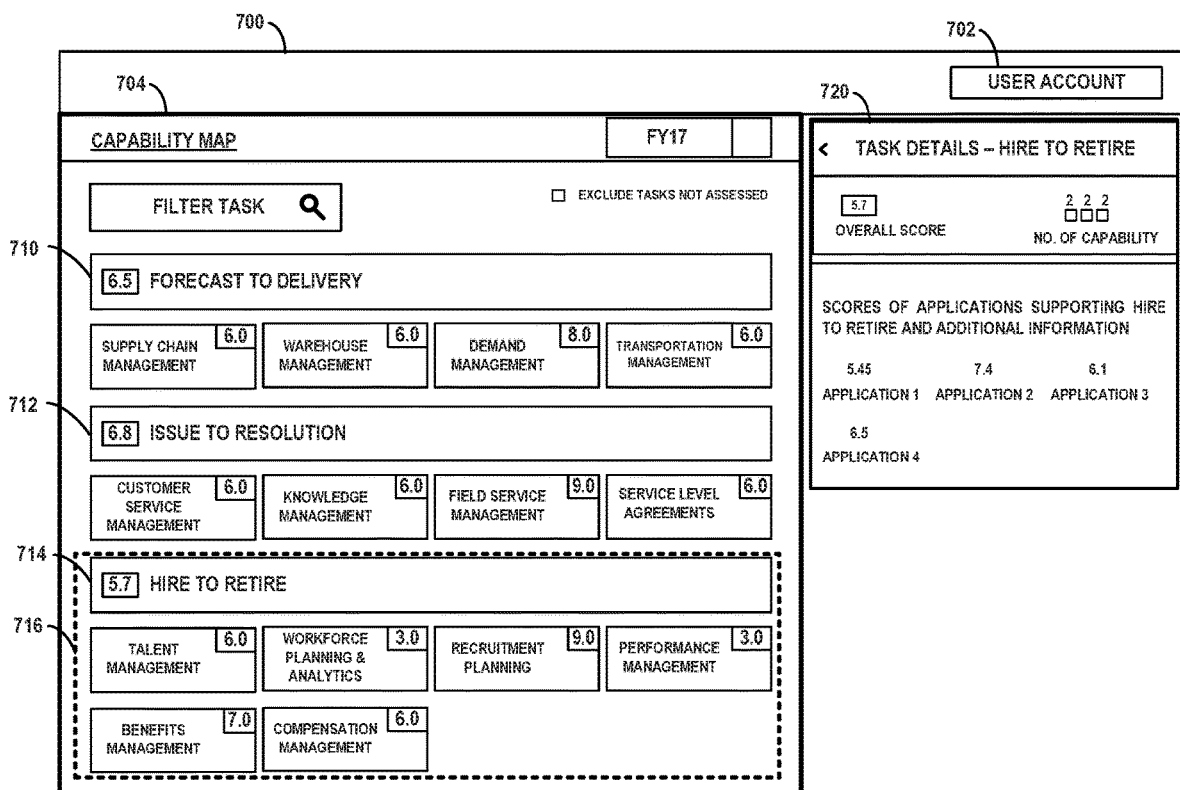
FIG. 7B depicts a selection of a task in the capability map of FIG. 7A, in accordance with example embodiments.

FIG. 7B depicts another graphical interface showing a selection of a particular task in the capability map of FIG. 7A, in accordance with example embodiments. An application portfolio management system may provide interface 700 after detecting a user selection of a task or capability displayed in capability map 704. As shown, interface 700 may further represent task details 720 that correspond to the task "Hire to Retire" 714 after detecting user selection 716 from a user.

The system may cause interface 700 to display task details 720 to convey additional information about the task "Hire to Retire" 714. In particular, task details 720 may represent how well capabilities and applications support the task "Hire to Retire" 714. As shown, task details 720 shows that the task "Hire to Retire" 714 is supported by two underlying capabilities ("Recruitment Planning" and "Benefits Management") with high capability scores ("9.0" and "7.0", respectively), two capabilities ("Talent Management" and "Compensation Management") with average capability scores (both "6.0"), and two low scoring capabilities ("Workforce Planning & Analytics" and "Performance Management"). A user may review task details 720 and capability map 704 to understand which capabilities are doing well and which capabilities may need potential improvements to better support the task "Hire to Retire" 714. For instance, a user of a client device operating in the HR operation of the enterprise network may review task details 720 to determine that further review of the applications supporting "Workforce Planning & Analytics" and "Performance Management" may help improve performance of the overall task "Hire to Retire" 714.

In addition, similar to capability map 704, task details 720 may also show scores assigned to underlying applications that support the task "Hire to Retire" 714. As shown, four applications supporting the task "Hire to Retire" 714 are assigned scores that a user may review via interface 700 to determine the effectiveness of the applications. In some cases, the user may use the scores assigned to the applications to identify applications that require further inspection. For example, the user may determine that a low scoring application requires an upgrade or removal from the application inventory of the enterprise network.

Figure 7C:
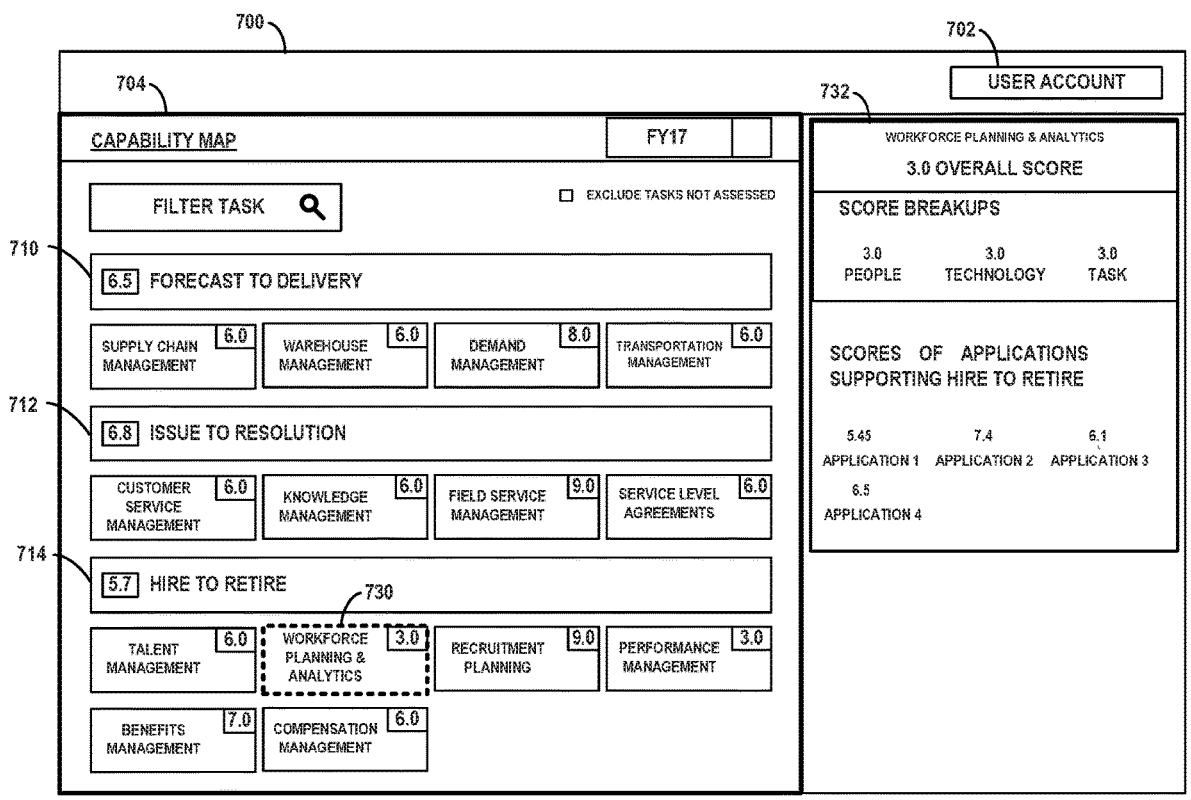
FIG. 7C depicts a selection of a capability in the capability map depicted in FIGS. 7A, 7B, in accordance with example embodiments.

FIG. 7C depicts a selection of a capability in the capability map depicted in FIGS. 7A, 7B, in accordance with example embodiments. As a result of detecting user selection 730 of "Workforce Planning & Analytics" that supports the task "Hire to Retire" 714, the application portfolio management system may cause interface 700 to further represent a second portion 732 configurable to show an overall score and the score break ups of the capability "Workforce Planning & Analytics." In addition, second portion 732 may also represent the scores of applications supporting the task "Hire to Retire" 714 overall.

As illustrated in FIG. 7C, second portion 732 represented in interface 700 shows that the capability "Workforce Planning & Analytics" has a "3.0" overall score along with "People", "Technology" and "Task" all receiving scores of "3.0". Since capability map 704 may assign scores from a scale of "0-10", the score of "3.0" for capability "Workforce Planning & Analytics" is a relatively low score, which may indicate to a user that the capability may require potential action, such as an overall review of the performance of the capability by the HR operation and underlying supporting applications. By contrast, the capability "Recruitment Planning" that also supports the task "Hire to Retire" 714 is shown having a much higher score of "9.0", which may indicate that the capability "Recruitment Planning" is performed more effectively than the capability "Workforce Planning & Analytics." As such, a user may view second portion 732 and capability map 704 to further understand the task "Hire to Retire" 714, the underlying impact of supporting capabilities, and the applications that support the task and/or capabilities.

FIG. 8 depicts a graphical interface for creating a representation of an idea, in accordance with example embodiments. As shown, graphical interface 800 includes user account 802, settings 804, idea section 806, and estimates section 808 elements that a user of a client device may view and provide information regarding. In other examples, graphical interface 800 may include more or fewer elements, including additional input categories. Idea section 806 and estimates section 808 represent portions of graphical interface 800 that enables a user to input information regarding a new idea and estimates for the new idea into the portfolio management system.

VI. Example Operations

Figure 9:
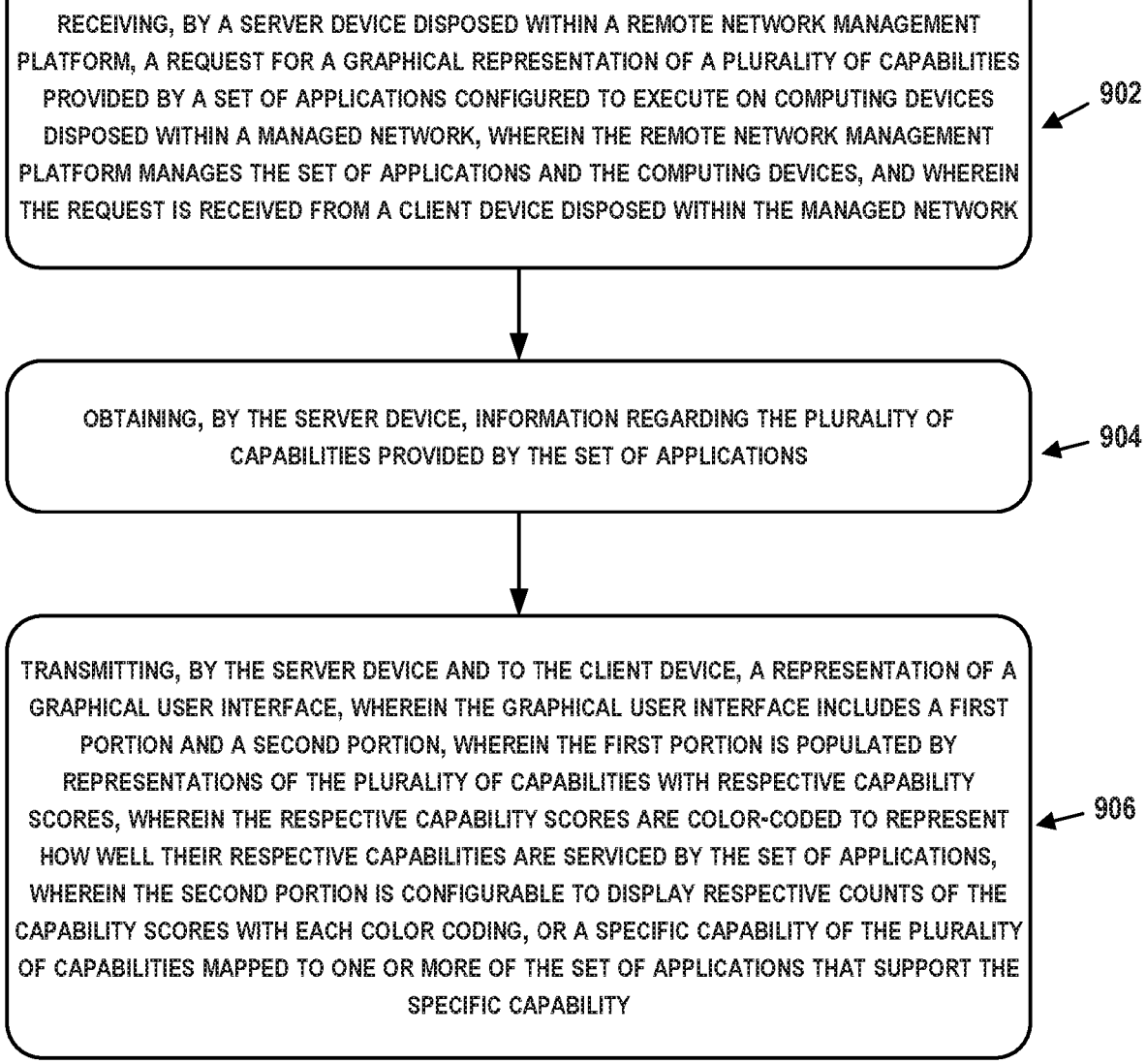
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

A. Receiving a Request for a Graphical Representation

Block 902 may involve receiving, by a server device disposed within a remote network management platform, a request for a graphical representation of a plurality of capabilities provided by a set of applications configured to execute on computing devices disposed within a managed network. The remote network management platform may manage the set of applications and the computing devices.

In an example implementation, a server device disposed within remote network management platform 320 may receive a request for a graphical representation that shows capabilities provided by applications that are used to complete tasks performed by an operation or multiple operations (e.g., HR, finance, IT, custom operations) within managed network 300. For example, the service device may receive the request for the graphical representation from a client device disposed within managed network 300.

In some cases, the request received at the server device within remote network management platform 320 may specify particular parameters for the graphical representation to provide. For instance, the request may specify a particular task performed by an operation of the enterprise network, such as financial applications used to complete payroll operations.

B. Obtaining Information Regarding Capabilities Provided by Applications

Block 904 may involve obtaining, by the server device, information regarding the plurality of capabilities provided by the set of applications. For instance, the server device or another entity within remote network management platform 320 may obtain information about tasks and capabilities performed by one or multiple operations, including information about underlying software applications that support each task or capability.

The server device may automatically obtain application information such that the server device in remote management platform 320 may provide application portfolio management tools to any authenticated client device. In another example, the server device may obtain the information from an inventory of application information stored in remote network management platform 320.

In a further example, an application portfolio management system may perform the discovery process described in FIG. 5B to obtain information about the inventory of applications in the enterprise network. For instance, the system may periodically obtain application information relating to all or a subset of tasks performed by one or more operations in the enterprise network.

C. Transmitting a Representation of a Graphical User Interface

Block 906 may involve transmitting, by the server device and to the client device, a representation of a graphical user interface. The server device or another entity within remote network management platform 320 may transmit the representation of the graphical user interface to the client device that originally requested the information as well as to other authenticated devices within the enterprise network. For example, the server device may transmit the representation of the graphical user interface via a web-based interface that enables the client device to render the graphical user interface on a display unit. In a further example, the server device may periodically update application information such that the application portfolio management tools are available to any authenticated device in the enterprise network to access in real-time.

The graphical user interface may have various configurations within examples. For instance, the graphical user interface may include a first portion populated by representations of the various capabilities with each capability have an assigned score. As discussed above, the capability scores may be color-coded to represent how well their respective capabilities are serviced by a set of applications that support the capabilities. In some examples, capabilities that are serviced by the set of applications above a first threshold service level may be assigned respective capabilities scores that are color-coded a first color (e.g., green). For example, capabilities that help an operation complete a task effectively may be assigned high scores (e.g., "8.0"-"10.0") and also color coded green to signal to a user that the capabilities are effective.

Conversely, capabilities that are serviced by the set of applications above a second threshold service level, but below the first threshold service level may be assigned respective capabilities scores that are color-coded a second color (e.g., orange). Particularly, the second threshold service level may represent a lower service level than the first threshold service level. As such, the capabilities may have average scores (e.g., "3.0"-"8.0") and be color coded orange to signal to a user that the capabilities are moderately effective, but may require additional review.

Additionally, capabilities that are serviced by the set of applications below the second threshold service level may be assigned respective capabilities scores that are color-coded a third color (e.g., red) to signal to a user that the capabilities scored poorly (e.g., "0.0"-"3.0"). As a result, the user may locate a capability that is likely performed poorly by the low score or the corresponding color (e.g., red).

In some examples, the second portion of the graphical user interface may be configurable to display respective counts of the capability scores with each color coding, or a specific capability of the plurality of capabilities mapped to one or more of the set of applications that support the specific capability. For instance, the second portion may represent an overall score for a selected task performed by an operation within the enterprise network and also include a score a breakup for the task. In some cases, the second portion of the graphical user interface may display the respective counts of the capability scores with each color coding when no specific capability of the plurality of capabilities is selected in the first portion of the graphical user interface, and may display the specific capability of the plurality of capabilities mapped to one or more of the set of applications that support the specific capability when the specific capability is selected in the first portion of the graphical user interface.

Additionally, the second portion of the graphical user interface may display scores indicative of overall use, technology, and task associated with the one or more of the set of applications that support the specific capability when the specific capability is selected in the first portion of the graphical user interface. The graphical user interface may also include a search tool that enables selection and subsequent display of a particular capability of the plurality of capabilities.

In some examples, an entity within remote management platform 320 may analyze a variety of information about the applications utilized by client devices 302 in remote management platform 320 in order to provide the graphical representations containing application information in an organized manner. For example, the graphical interface may convey the rate of use, dates of origin, and last update of each application, among other possible information. As such, the server device may transmit one or more representations of graphical user interfaces conveying application information to one or multiple devices. For example, the server device may transmit the graphical user interface using Internet 350 to one or multiple client devices 302 or other entities within managed network 300 or elsewhere.

C. Other Variations and Embodiments

In a further example, a system may include means for receiving a request for a graphical representation of a plurality of capabilities provided by a set of applications configured to execute on computing devices disposed within a managed network. For example, the system may include means for a server device operating in a remote network management platform to receive the request, and the remote network management may manage the set of applications and the computing devices. In some examples, the system may include means for receiving the request from a client device disposed within the managed network.

The system may further include means for obtaining information regarding the plurality of capabilities provided by the set of applications. For example, the system may include means for obtaining the information by the server device. The system may also include means for transmitting a representation of a graphical user interface. Particularly, the graphical user interface may include a first portion and a second portion with the first portion populated by representations of the plurality of capabilities with respective capability scores. The respective capability scores may be color-coded to represent how well their respective capabilities are serviced by the set of applications. Further, the second portion may be configurable to display respective counts of the capability scores with each color coding, or a specific capability of the plurality of capabilities mapped to one or more of the set of applications that support the specific capability.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a proxy server application disposed within a managed network, wherein the managed network includes one or more computing devices configured to execute one or more sets of applications that provide a plurality of respective capabilities for performing a plurality of tasks; and
   one or more server devices disposed within a remote network management platform configured to manage the managed network, wherein the one or more server devices are configured to obtain information regarding each application of the one or more sets of applications via one or more automated discovery processes comprising one or more inquiries by the proxy server application, and wherein the one or more server devices comprise one or more processors configured to:
      receive, from a client device disposed within the managed network, a request for a graphical representation of the plurality of tasks and the plurality of respective capabilities for performing the plurality of tasks, wherein the plurality of tasks includes one or more tasks generated via the one or more automated discovery processes of the managed network;
      determine respective capability scores for the plurality of respective capabilities based on the information regarding each application of the one or more sets of applications automatically obtained via the one or more inquiries, wherein the information comprises performance data associated with each application of the one or more sets of applications with regard to performing the plurality of tasks;
      transmit, to the client device, a representation of a graphical user interface, wherein the graphical user interface includes a first portion and a second portion, wherein the first portion is populated by representations of each task of the plurality of tasks mapped to respective subsets of representations of the plurality of respective capabilities for performing the task and the respective capability scores, and wherein the second portion is configurable to display additional information regarding a specific capability of the plurality of respective capabilities; and
      transmit, to the client device, an updated representation of the graphical user interface in response to a selection of the specific capability of the plurality of respective capabilities, wherein the updated representation comprises the first portion and the second portion comprising a particular set of applications of the one or more sets of applications that support the specific capability and respective application scores associated with each application of the particular set of applications that are indicative of an effectiveness with regard to supporting the specific capability and performing the task.

2. The system of claim 1, wherein the respective capability scores are color-coded to represent how well the plurality of respective capabilities are supported by the one or more sets of applications and the second portion of the graphical user interface displays an indication of respective counts of each type of color-coded capability score when no specific capability of the plurality of respective capabilities is selected in the first portion of the graphical user interface.

3. The system of claim 1, wherein the client device comprises a display unit configured to render the graphical user interface upon receiving the representation of the graphical user interface.

4. The system of claim 1, wherein a first set of capability scores of the respective capability scores are color-coded with a first color based on each of the first set of capability scores exceeding a first threshold service level.

5. The system of claim 4, wherein a second set of capability scores of the respective capability scores are color-coded with a second color based on each of the second set of capability scores exceeding a second threshold service level but less than the first threshold service level, wherein the second color differs from the first color.

6. The system of claim 5, wherein a third set of capability scores of the respective capability scores are color-coded with a third color based on each of the third set of capability scores being less than the second threshold service level, wherein the third color differs from the first color and the second color.

7. The system of claim 1, wherein the graphical user interface includes a search tool that enables selection and subsequent display of a particular capability of the plurality of respective capabilities.

8. The system of claim 1, wherein the one or more processors are configured to transmit the representation of the graphical user interface via a web-based interface.

9. The system of claim 1, wherein the information obtained via the one or more inquiries is stored in an inventory of application information associated with the remote network management platform.

10. The system of claim 1, wherein the information automatically obtained via the one or more inquiries comprises a frequency of use associated with each computing device of the one or more computing devices of each application of the one or more sets of applications.

11. An article of manufacture including a non-transitory computer-readable medium, having stored thereon program instructions that, upon execution by a server device disposed within a remote network management platform, cause the server device to perform operations comprising:
   receiving a request for a graphical representation of a plurality of tasks and a plurality of respective capabilities for performing the plurality of tasks provided by one or more sets of applications configured to execute on one or more computing devices within a network managed by the remote network management platform, wherein the request is received from a client device disposed within the managed network, and wherein the plurality of tasks includes one or more tasks generated via one or more automated discovery processes of the network;
   determining respective capability scores for the plurality of respective capabilities based on information regarding each application of the one or more sets of applications automatically obtained via the one or more automated discovery processes, wherein the information comprises performance data associated with each application of the one or more sets of applications with regard to performing the plurality of tasks;
   transmitting, to the client device, a representation of a graphical user interface, wherein the graphical user interface includes a first portion and a second portion, wherein the first portion is populated by representations of each task of the plurality of tasks mapped to respective subsets of representations of the plurality of respective capabilities for performing the task and the respective capability scores, and wherein the second portion is configurable to display additional information regarding a specific capability of the plurality of respective capabilities; and transmitting, to the client device, an updated representation of the graphical user interface in response to a selection of the specific capability of the plurality of respective capabilities, wherein the updated representation comprises the first portion and the second portion comprising a particular set of applications of the one or more sets of applications that support the specific capability and respective application scores associated with each application of the particular set of applications that are indicative of an effectiveness with regard to supporting the specific capability and performing the task.

12. The article of manufacture of claim 11, wherein the respective capability scores are color-coded to represent how well the plurality of respective capabilities are supported by the one or more sets of applications and the second portion of the graphical user interface displays an indication of respective counts of each type of color-coded capability score when no specific capability of the plurality of respective capabilities is selected in the first portion of the graphical user interface.

13. The article of manufacture of claim 11, wherein the request for the graphical representation of the plurality of respective capabilities indicates the plurality of tasks performed by the plurality of respective capabilities.

14. The article of manufacture of claim 11, wherein a first set of capability scores of the respective capability scores are color-coded with a first color based on each of the first set of capability scores exceeding a first threshold service level.

15. The article of manufacture of claim 14, wherein a second set of capability scores of the respective capability scores are color-coded with a second color based on each of the second set of capability scores exceeding a second threshold service level but less than the first threshold service level, wherein the second color differs from the first color.

16. A method comprising:
receiving, by a server device disposed within a remote network management platform, a request for a graphical representation of a plurality of tasks and a plurality of respective capabilities for performing the plurality of tasks provided by one or more sets of applications configured to execute on one or more computing devices within a network managed by the remote network management platform, wherein the request is received from a client device disposed within the managed network, and wherein the plurality of tasks includes one or more tasks generated via one or more automated discovery processes of the network;
determining, by the server device, respective capability scores for the plurality of respective capabilities based on information regarding each application of the one or more sets of applications automatically obtained via the one or more automated discovery processes, wherein the information comprises performance data associated with each application of the one or more sets of applications with regard to performing the plurality of tasks;
transmitting, by the server device and to the client device, a representation of a graphical user interface, wherein the graphical user interface includes a first portion and a second portion, wherein the first portion is populated by representations of each task of the plurality of tasks mapped to respective subsets of representations of the plurality of respective capabilities for performing the task and the respective capability scores, and wherein the second portion is configurable to display additional information regarding a specific capability of the plurality of respective capabilities; and
transmitting, by the server device to the client device, an updated representation of the graphical user interface in response to a selection of the specific capability of the plurality of respective capabilities, wherein the updated representation comprises the first portion and the second portion comprising a particular set of applications of the one or more sets of applications that support the specific capability and respective application scores associated with each application of the particular set of applications that are indicative of an effectiveness with regard to supporting the specific capability and performing the task.

17. The method of claim 16, wherein the client device comprises a display unit configured to render the graphical user interface upon receiving the representation of the graphical user interface.

18. The method of claim 16, wherein the graphical user interface includes a search tool that enables selection and subsequent display of a particular capability of the plurality of respective capabilities.

* * * * *